April 18, 1967 M. BLUMBERG ET AL 3,315,095

TRANSISTORIZED PULSE TO D.C. CONVERTER

Filed Jan. 23, 1964

INVENTORS,
MARTIN BLUMBERG
JOSEPH A. HOLLY
BY: Harry M. Saragovitz, Edward J. Kelly, Herbert Berl & Julian C. Keppler
ATTORNEYS.

United States Patent Office 3,315,095

Patented Apr. 18, 1967

3,315,095

TRANSISTORIZED PULSE TO D.C. CONVERTER

Martin Blumberg and Joseph A. Holly, Los Altos, Calif., assignors to the United States of America as represented by the Secretary of the Army Filed Jan. 23, 1964, Ser. No. 339,828
7 Claims. (Cl. 307—88.5)

This invention relates to converters and particularly to transistorized, pulse to D.C. converters.

There is often a need to convert a repetitious pulse into a direct current that is proportional to the repetition rate, the amplitude, and the duration of the pulse. For example, in an automatic gain control unit to be used with an intermediate frequency amplifier in a pulse system, the repetitious output pulses of the intermediate frequency amplifier are fed into a second detector, then video amplified, and then filtered to a direct voltage, that will be proportional to the amplitude of the pulses, to serve as an automatic gain control for the pulse amplifying stage.

The prior art systems use one or more diodes connected to capacitors to stretch the pulses, and require high-impedance-input vacuum tubes or transistor stages to provide additional amplification of the filtered pulse output and to reduce it to a low-enough impedance to carry any significant load.

The main disadvantage of these systems is in the number of components required, with the attendant extra weight, complexity, cost, and the possibility of failure.

It is therefore an object of this invention to provide an improved pulse to D.C. converter with a minimum number of parts.

It is a further object of this invention to provide an improved pulse to D.C. converter that provides detection and amplification in a single stage.

These and other objects of this invention are accomplished by applying negative pulses to the input (base) electrode of a common-emitter-connected transistor through a fairly large storage capacitor. Another storage capacitor for the D.C. output is connected to the emitter circuit.

The transistor is normally biased in an "off" condition, and the negative going pulses bias it still further "off," but as soon as the negative voltage of the pulses reaches the Zener voltage level between the base and emitter electrodes of the transistor, the impedance between these electrodes drops and current flows, backwards, from the emitter to the base electrode, to charge the input storage capacitor to the level of the negative pulse. When the pulse is terminated, the source of negative pulses returns to its normal voltage level but the charged capacitor now raises the base electrode to a correspondingly-higher, more positive, voltage level, which raises the emitter-follower to a higher, more-positive voltage level to charge the D.C.-output, storage condenser and maintain the low-impedance direct voltage supply.

This invention will be better understood and other and further objects of this invention will become apparent from the following specification and the drawings which show variations of a circuit diagram of a typical embodiment of this invention.

Referring now to FIG. 1, a source of input pulses 10 is applied to terminal 11 across a resistor 12 and also across the series combination of another resistor 14, a capacitor 16, and the input of the transistor 20 which is connected in a common-emitter configuration.

The emitter electrode 22 and the collector electrode 23 connect in series with the resistors 32, 33, and 34 across the power supply terminals 30–31. The resistors 35 and 36 connect the positive terminal 30 of the power supply to the base electrode 21 as part of the biasing network.

The storage capacitor 40 is connected between the junction of the resistors 32 and 33 and a ground terminal 38. The output circuit is connected directly across the storage capacitor 40 between terminals 41 and 38.

The resistor 12 provides the terminating impedance for the source of input pulses 10, and the resistor 14 provides the equivalent of the output impedance of a typical transistor driving stage, which may be substituted for the units 10, 12, and 14.

The condenser 16 decouples the source of input pulses from the transistor. The resistors 32 and 33 are the emitter load of the circuit and establish the voltage level of the condenser 40. This voltage level is also controlled by the resistor 34, and the resistors 35 and 36 which regulate the bias, and, thereby, the resistance of the transistor in the circuit.

In operation, a negative pulse is applied by the source 10, through the condenser 16, to the base electrode 21 of the transistor 20. This drives the transistor base more negative with respect to the emitter 22.

However, when the potential difference between the base and the emitter electrodes reaches the Zener-voltage level for this particular transistor, a reverse current flows between the emitter and the base electrodes to build up a positive charge on the base electrode side of the capacitor 16 with respect to the input side of the capacitor. This positive charge is proportional to the amplitude of the negative pulse.

When the pulse ends, and the input side of the capacitor returns to its original level, the positively charged side of the capacitor drives the base electrode of the transistor to a level that is more positive than its original level, which causes the transistor to conduct more heavily in the normal direction between the collector and emitter electrodes. In other words, the current between the emitter and collector electrodes is increased, between pulses, by an amount proportional to the amplitude of the pulse.

As the current increases, between pulses, the emitter-follower action of the transistor raises the voltage across resistors 32 and 33, which raises the charge on the condenser 40 up to a new level proportional to the input as established by the charge on the capacitor 16. The relatively high impedance of the common-emitter input circuit and the substantial value of the capacity of the capacitor 16 maintains the charge on this capacitor for a substantial length of time, which holds the voltage level of the base electrode to maintain the current through the transistor at the new level. This provides a relatively-constant, low-impedance source of direct current proportional to the amplitude of the input pulse, through the load resistors 32 and 33 which in turn provides a relatively constant, low-impedance source of voltage, proportional to the amplitude of the input pulse, but of the opposite polarity, across the capacitor 40.

That is to say, the change in the level of the direct voltage output will always be positive when the change in the level of the pulse amplitudes is negative. A more negative going pulse level will produce a more positive direct voltage output level. The filtering effect of the large capacity of the capacitor 40, in turn, maintains the level of the direct voltage substantially constant during the pulse interval when the emitter-collector current of the transistor is cut off.

The relation between the direct voltage output level, the transistor power supply level, and ground level is relative. The ground level may be at the level of the positive voltage source terminal 30 of the power supply, ɩs in FIG. 1, or it may be at the level of the negative voltage source 31 of the power supply as in FIG. 2, or it may be at a voltage level between the two, as shown n FIG. 3.

Figure 1:
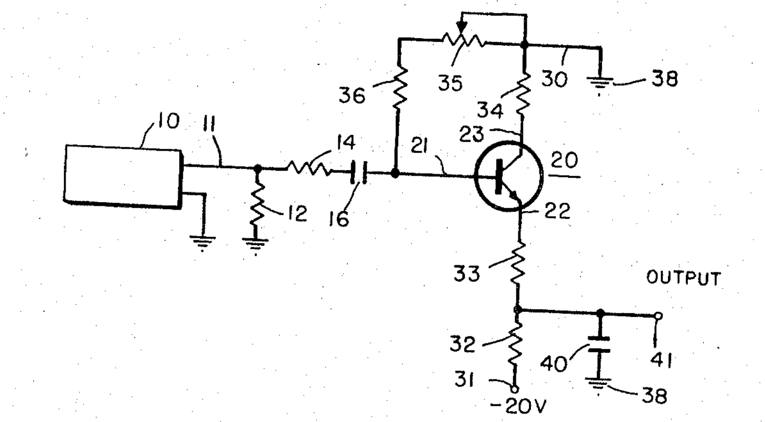
Figure 2:
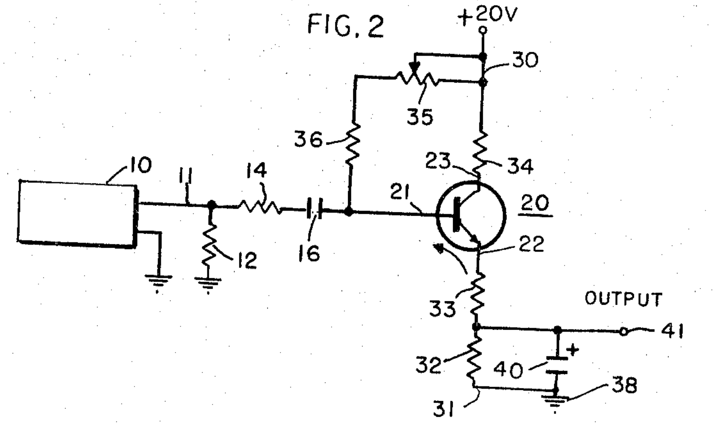
FIG. 2 shows the typical circuit with the negative terminal 31 of the power supply grounded, but with all the other elements of the circuit the same as those in FIG. 1 and having the same markings.
Figure 3:
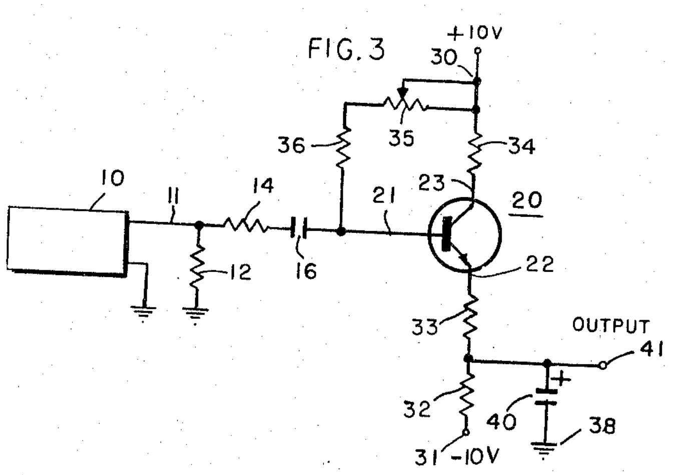
FIG. 3 shows the same circuit with the power supply providing a positive voltage at 30 and a negative voltage at 31 with respect to a ground potential at some fixed value between the two. Here, as in FIG. 2, the same elements have the same markings as those of FIG. 1.

In both FIGS. 2 and 3 the operation is the same as the operation of the circuit of FIG. 1, and in both figures, the output voltage level becomes more positive as the peak voltage level of the input pulses becomes more negative. However, in FIG. 1, the direct-current, output voltage is always negative with respect to ground; in FIG. 2, the direct-current, output voltage is always positive with respect to ground; and in FIG. 3, the direct-current, output voltage level may be either above or below ground potential.

As noted earlier, the input to the transistor may be from other pulse sources, or from another transistor driving stage, which then replaces the circuit elements 10, 12, and 14. This does not affect the production of a direct-current output proportional to the peak voltage level of the input, but it may change the relative levels of the voltages with respect to ground.

In a typical circuit built according to this invention, the resistor 12 was 47 ohms, the resistor 14 was 1000 ohms, the resistor 32 was 5600 ohms, the resistor 33 was 100 ohms, the resistor 34 was 100 ohms, the potentiometer 35 was 250,000 ohms and the resistor 36 was 220,000 ohms. The capacitor 16 was 1 microfarad, the capacitor 40 was 18 microfarads and the transistor 20 was a 2N334 type. The voltage supply was 20 volts.

What is claimed is:

1. A pulse to D.C. converter comprising
- a transistor having input connections and output connections, and a given Zener voltage level with respect to said input connections;
- a load resistor;
- a source of direct voltage;
- a source of pulses of a given potential;
- a first capacitor connecting said source of pulses to said input connections of said transistor;
- said given potential of said pulses being greater than said given Zener voltage level of said transistor;
- means for connecting said output connections of said transistor in series with said load resistor across said source of direct voltage; and
- a second capacitor connected across said load resistor.

2. A pulse to D.C. converter comprising
- a transistor having base, emitter, and collector electrodes, and a given Zener voltage level between said base and emitter electrodes;
- a load resistor;
- a source of direct voltage;
- a first storage capacitor;
- a second storage capacitor;
- means for generating negative pulses of a peak voltage substantially greater than that of said given Zener voltage level between said base and emitter electrodes of said transistor;
- means for connecting said first storage capacitor between said means for generating negative pulses and said base and emitter electrodes of said transistor;
- means for connecting said load resistor in series with said emitter and collector electrodes across said source of direct voltage;
- means for connecting said second storage capacitor across said load resistor; and
- means for biasing said transistor.

3. A pulse to D.C. converter comprising
- a transistor having base, emitter, and collector electrodes, and a given Zener voltage level between said base and emitter electrodes;
- a load resistor;
- a source of direct voltage having a positive terminal and negative terminal;
- a first capacitor;
- a second capacitor;
- means for generating pulses, negative with respect to ground, of a voltage substantially greater than said given Zener voltage level between said base and emitter electrodes of said transistor;
- means for connecting said first capacitor between said means for generating pulses and said base electrode of said transistor;
- means for connecting said load resistor between said emitter electrode and said negative terminal of said source of direct voltage;
- means for connecting said second capacitor between said emitter electrode and ground;
- means for connecting said collector electrode to said positive terminal of said source of direct voltage;
- biasing-resistor means connected between said positive terminal of said source of direct voltage and said base electrode of said transistor;
- and means for grounding said source of direct voltage.

4. A pulse to D.C. converter as in claim 3 wherein said means for grounding said source of direct voltage is connected to said positive terminal of said source of direct voltage.

5. A pulse to D.C. converter as in claim 3 wherein said means for grounding said source of direct voltage is connected to said negative terminal of said source of direct voltage.

6. A pulse to D.C. converter as in claim 3 wherein said means for grounding said source of direct voltage is connected to said source of direct voltage at a potential between the potentials of said positive and negative terminals.

7. A pulse to D.C. converter comprising
- a transistor having base, emitter, and collector electrodes, and a given Zener voltage level between said base and emitter electrodes;
- first, second, third, fourth, fifth, and sixth resistors;
- first and second storage capacitors;
- a source of direct voltage with respect to ground having a positive terminal and a negative terminal;
- a source of pulses, negative with respect to ground, having a peak voltage substantially greater than that of said given Zener voltage level between said base and emitter electrodes of said transistor;
- said first and second resistors being connected in series between said negative terminal of said source of direct voltage and said emitter electrode;
- said third resistor being connected between said positive terminal of said source of direct voltage and said collector electrode;
- said fourth resistor being connected between said positive terminal of said source of direct voltage and said base electrode;
- said fifth resistor and said first capacitor being connected in series between said source of pulses and said base electrode;
- said sixth resistor being connected between said source of pulses and ground;
- said second capacitor being connected between the junction of said first and second resistors and ground;
- and output terminals being connected across said second capacitor.

No references cited.

ARTHUR GAUSS, *Primary Examiner.*

J. ZAZWORSKY, *Assistant Examiner.*